July 16, 1940.   R. D. SHAW   2,207,830
TRACER CONTROLLED MACHINE TOOL
Filed Sept. 26, 1938   5 Sheets-Sheet 1

INVENTOR.
*R. D. Shaw*
BY *Joseph N. Schofield*
ATTORNEY

July 16, 1940. R. D. SHAW 2,207,830
TRACER CONTROLLED MACHINE TOOL
Filed Sept. 26, 1938 5 Sheets-Sheet 2

INVENTOR.
R. D. Shaw
BY Joseph K. Schofield
ATTORNEY

July 16, 1940. R. D. SHAW 2,207,830
TRACER CONTROLLED MACHINE TOOL
Filed Sept. 26, 1938 5 Sheets-Sheet 3

INVENTOR
R. D. Shaw
BY Joseph R. Schofield
ATTORNEY

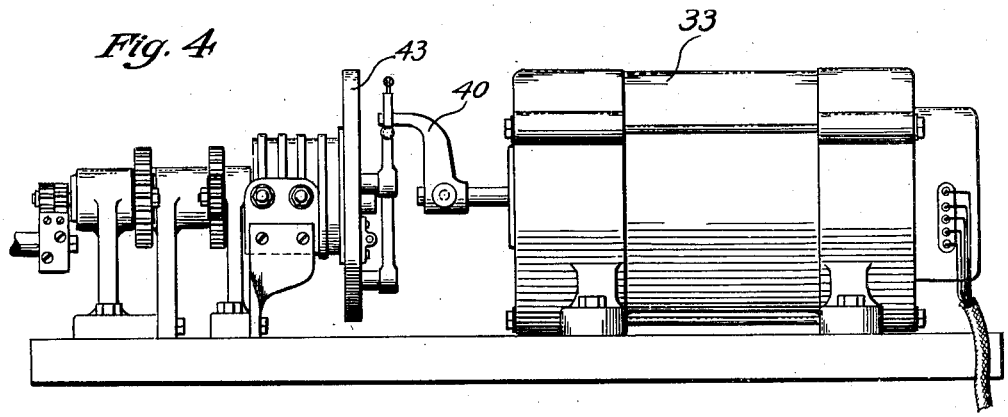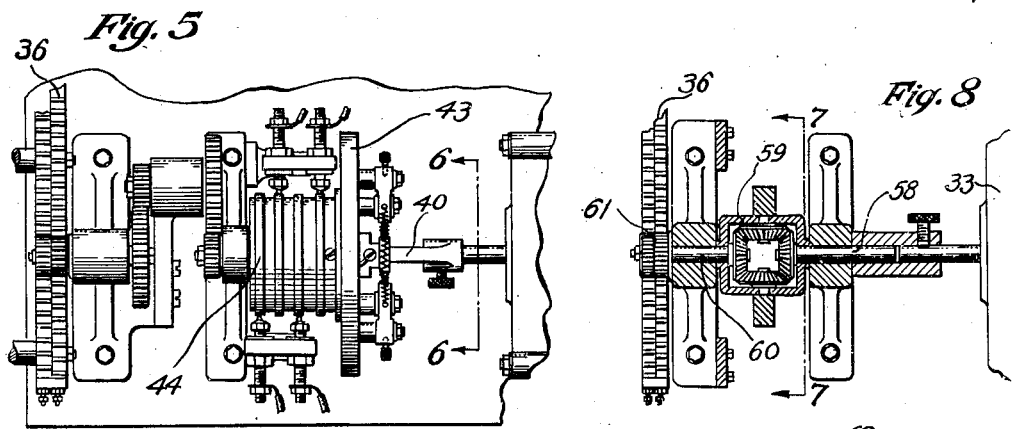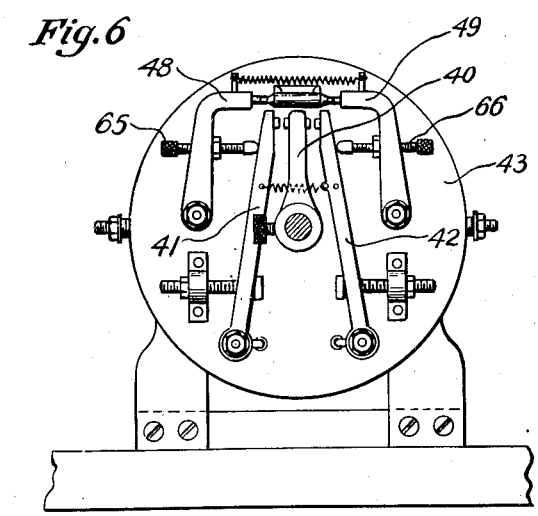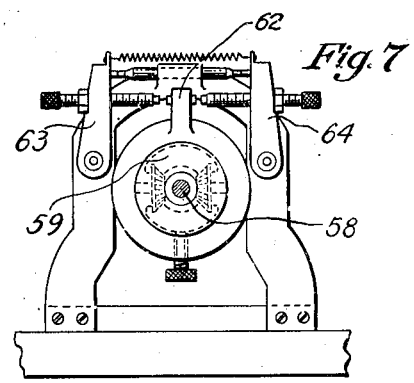

Patented July 16, 1940

2,207,830

UNITED STATES PATENT OFFICE 2,207,830

TRACER CONTROLLED MACHINE TOOL

Robert D. Shaw, Bloomfield, Conn., assignor to Niles-Bement-Pond Company, Hartford, Conn., a corporation of New Jersey Application September 26, 1938, Serial No. 231,689

15 Claims. (Cl. 90—13.5)

This invention relates to machine tools such as copying milling machines and particularly to an automatic die sinking machine, the movements of the cutter relative to the work being controlled by a tracer movable over a pattern or model corresponding to the die or other work being formed, the pattern or model and tracer being mounted independently of the support for the work piece and cutting tool upon a separate support or base therefrom.

An object of the present invention is to provide an improved cooperative relationship between the tracer moving mechanism of a copying milling machine and its cutter moving mechanism, movements of which are controlled thereby so that the movements of the cutter may be controlled by a tracer moving relative to a model or pattern mounted remote from and connected to the cutting machine by flexible means such as an electric cable, etc.

Another object of the invention is to provide two electrically controlled and operated machines electrically coupled together by the circuits of pairs of self-synchronous units, one of the machines having a tracer mechanism movable relative to a model and thereby rotating the generators of the self-synchronizing units; and the other machine having a cutter mechanism movable over a work piece to reproduce the work piece in accordance with the model upon a larger or smaller scale or a left- or right-hand form opposite to that of the model, the movements of the cutter being controlled by contacts opened and closed by rotation of the motors respectively of the self-synchronous units.

One feature of importance of the invention is that movements of the tracer relative to the model are effected in three directions at right angles to each other, a movement in any direction serving to actuate the generator or generators of one or more of the self-synchronizing units, there being three of these generators on the tracing machine, one for each direction of the three co-ordinate planes and each of these generators being connected respectively to its motor of the self-synchronous units, the motors in turn being mounted on the cutting machine and controlling movements of the cutter relative to the work piece so that, whenever any of the self-synchronizing generators on the model traversing or tracing machine is actuated, a corresponding movement is effected in the particular motor coupled directly to that generator.

Another object of the invention is to so mount and connect these motors of the self-synchronizer units on the cutting machine that when they are rotated by their respective generators they will close contacts, which may operate through relays, to effect movements of the cutter in the direction called for by movement of the tracer and by movement of the generator coupled to that motor.

And finally it is an object of the invention that this motion of the cutter, in turn, when it has been completed, will again open the contacts so that the motion will be discontinued.

The machine forming the embodiment of the invention shown and described herein is designed to effect the operations performed by the machine shown and described in the patent to Shaw 1,683,581 granted September 4, 1928, when operating either as an automatic die sinking or as a profiling machine and the circuits described in this patent are made use of in the present instance in the tracing machine.

Die sinking machines such as disclosed in the above-mentioned patent have their tracer mounted on and movable with the cutter slide. This necessitates mounting the tracer on an extension formed on and extending upward from the cutter slide. Any vibration imparted to the machine by the cutting action of the cutter is transmitted to the tracer and adversely affects its operation on the work by preventing a smooth surface being formed. By the present invention the tracer and its model are mounted entirely independently from the cutter and work piece so that the tracer is subjected to no vibration whatever due to the cutting operation and is traversed smoothly over the model in the same manner and by the same electric circuits described and shown in the above referred to patent.

As the connections between the tracing and cutting machines in the present invention are in the form of electric cables, one tracing machine may have its circuits coupled to the circuits of more than one cutting machine, and, by reversing the motion in one direction of the cutting machine relative to the corresponding direction of motion in the tracing machine a reversed counterpart of the model can be produced; that is, with a right-hand model the corresponding left-hand article can be formed. Also by changing the ratios in the connections between the motions imparted to a generator by movements of the tracer, and its motor by movements of the cutter, a model may be reproduced in a work piece upon an enlarged or reduced scale.

With the above and other objects in view, my invention consists in the features of construction and operation set forth in the following specification and illustrated in the accompanying drawings.

In the accompanying drawings annexed hereto and forming a part of this specification, I have shown the invention embodied in a large size automatic die sinking and profiling machine of the type shown and described in the above referred to patent, but it will be understood that the invention can be otherwise embodied and that the drawings are not to be construed as defining or limiting the scope of the present invention, the claims appended to this specification being relied upon for that purpose.

In the drawings:

Fig. 4 is a side elevation of the motor element of one of the self-synchronizing units showing its connection to a contact disc controlling movements of the cutter of the die sinking machine in one direction.

Fig. 5 is a plan view of the contact disc and connections therefor shown in Fig. 4.

Fig. 6 is a transverse section taken on the plane of line 6—6 of Fig. 5 and showing contacts opened and closed by rotation of the motor armature shown in Figs. 4 and 5.

Fig. 7 is a side elevation of a modified form of contact carrying member looking in the direction of arrows 7—7 in Fig. 8.

Fig. 8 is a horizontal sectional view of the parts shown in Fig. 7.

In the above-mentioned drawings I have shown but one complete embodiment of the invention, a modified form of the contact carrying member which is now deemed preferable being also shown, but it is to be understood that many structural and operating changes and modifications may be made within the scope of the appended claims without departing from the spirit of the invention.

Briefly, and in its broadest aspect, the invention may include the following principal parts: First, a milling machine having means for relatively moving a cutter in three directions at right angles to each other relative to a work blank preferably fixed in position on the base of the machine; second, electromagnetic means for moving the cutter in each of these directions; third, means to rotate the cutter at the proper speeds for proper cutting operations; fourth, a tracer traversing machine preferably having a tracer movable relative to the surface of a fixed model in three directions normal to each other similarly to the movements of the cutter relative to the work blank; fifth, generators of self-synchronizers mounted on the tracing machine having their rotors rotatable by movements of the tracer supporting slides, there being one of these generators for each direction of movement; sixth, follower motors on the cutting machine, each motor being electrically connected to one of the generators of the self-synchronizers so that rotation of a generator rotor will correspondingly rotate the rotor of its follower motor; seventh, contacts opened and closed by rotation of each follower motor; eighth, relays controlled by these contacts for effecting movement of the cutter in the direction called for thereby; and ninth, means coupled with the cutter spindle moving means to rotate the member on which the contacts are mounted so that when the movement called for by a generator has been completed the contacts will again be opened and further motion discontinued.

Figure 1:
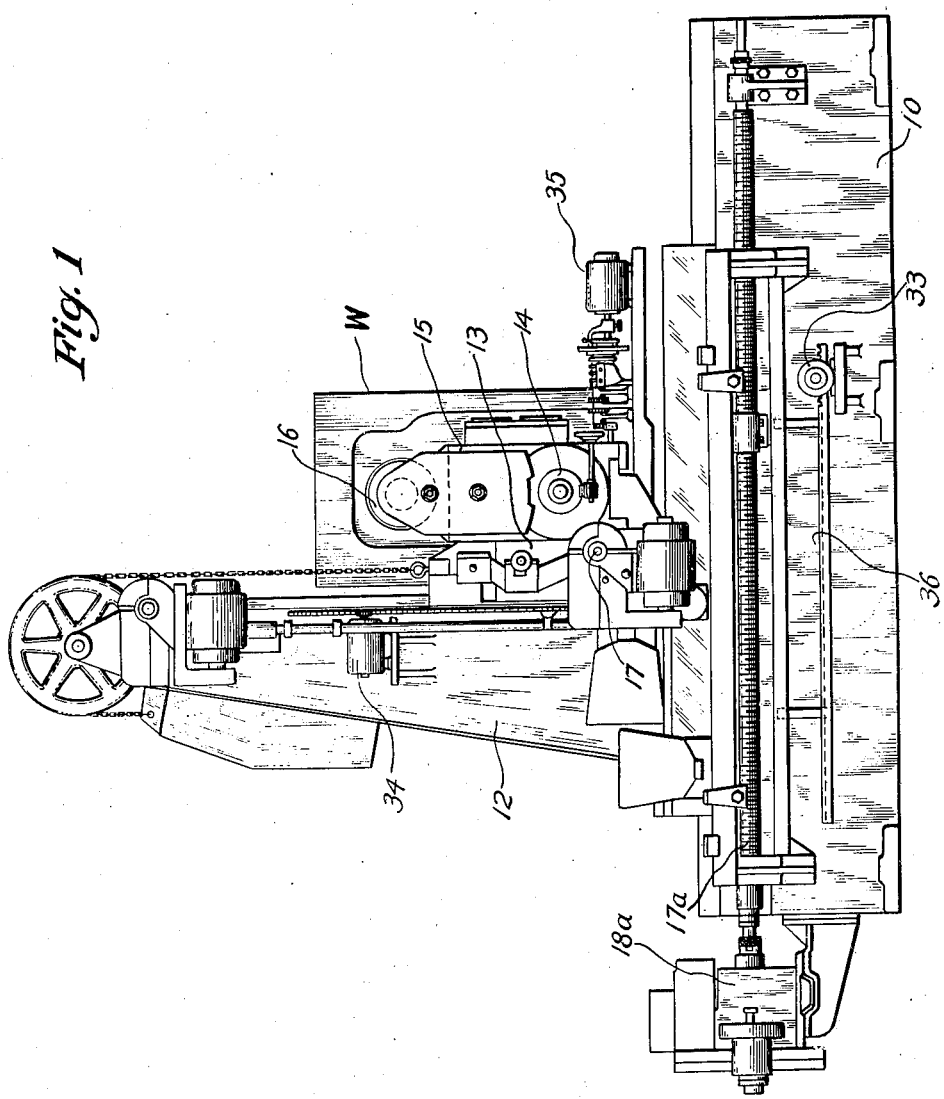
Figure 1 is a front elevation of a complete die sinking machine having a fixed work support and a cutting tool movably mounted relative thereto in three directions at right angles to each other.
Figure 2:
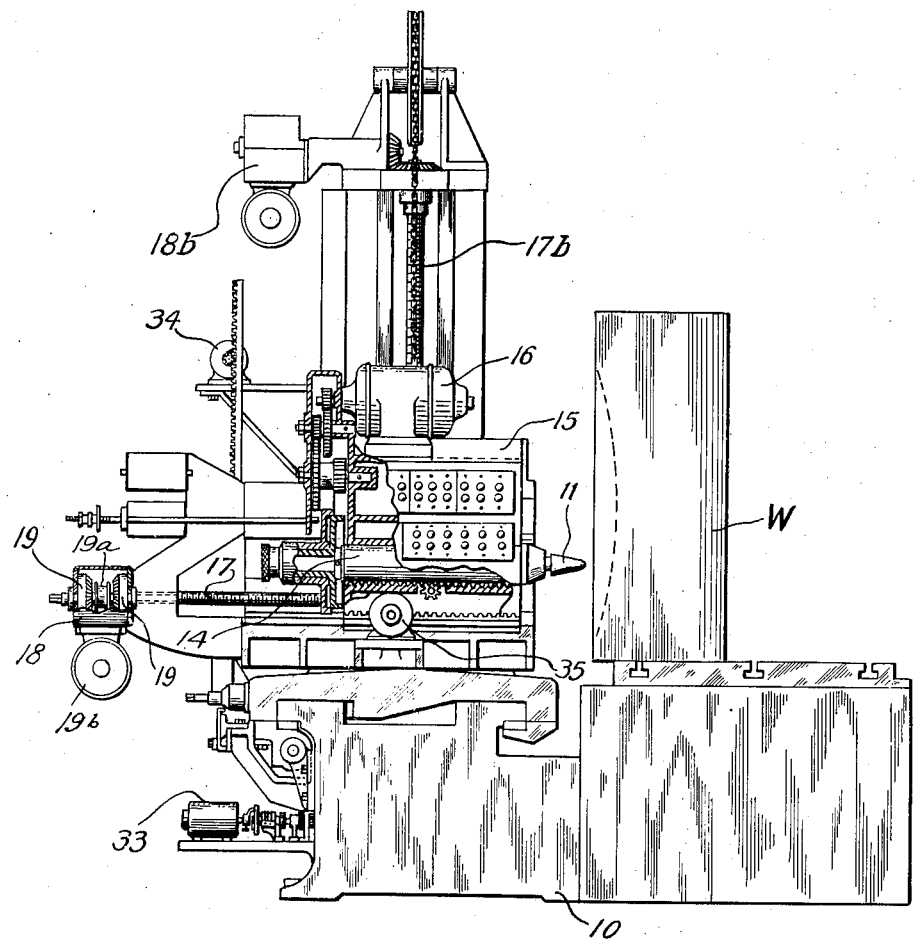
Fig. 2 is a side elevation of the die sinking machine shown in Fig. 1.

Referring more in detail to the figures of the drawings, Figs. 1 and 2 show outside views of a complete die sinking machine on which a work piece W is mounted and secured thereto in fixed position upon the base 10. The milling cutter 11 is movable relative to this work piece W on slides movable respectively in the direction of the three co-ordinate planes, which movements correspond to those described in the above-referred to patent. In order to effect the movements of the cutter 11 there is provided a column 12 movable in a horizontal plane longitudinally along the base 10. On this column 12 is mounted a vertically movable head 13. Within the head 13 is mounted a cutter spindle 14 and slide 15 therefor movable in a direction toward and from the work blank W. These members 12, 13 and 15 move at right angles to each other and are individually controlled by means presently to be more fully described. Mounted on the transverse slide 15 is a cutter rotating motor 16 connected by suitable gearing to the cutter spindle 14 in order to rotate the cutting tool 11 at appropriate speeds. As the construction of and means for effecting horizontal movements of the column 12, vertical movements of the head 13, and transverse movements of the cutter slide 15 are entirely similar to the means for effecting movements of corresponding parts in the above-mentioned patent, it is not thought necessary to describe these members and this mechanism more in detail. It will be sufficient to state that each of these members 12, 13 and 15 is controlled by a suitable operating screw, one of which is shown at 17, for moving the cutter 11 toward and from the work piece W. This screw 17 is rotatable in opposite directions by an electromagnetic drive 18 comprising an armature 19$^a$ geared directly to the shaft 17 and disposed between electromagnets 19, which are driven in opposite directions by a motor 19$^b$. By energizing one or the other of these electromagnets 19 the screw 17 associated therewith may be rotated in either direction. The screw 17 and electromagnets 19 above referred to are those employed for effecting movements of the cutter slide 15 directly toward and from the work blank W. A generally similar screw 17$^a$ (Fig. 2) and electromagnetic drive 18$^a$ are shown for effecting longitudinal movements of the column 12 along the base 10. Also screw 17$^b$ and electromagnetic drive 18$^b$ are employed to raise and lower the cutter head 13 on the column 12. Each mechanism is similar to the others but operates independently thereof.

Figure 3:
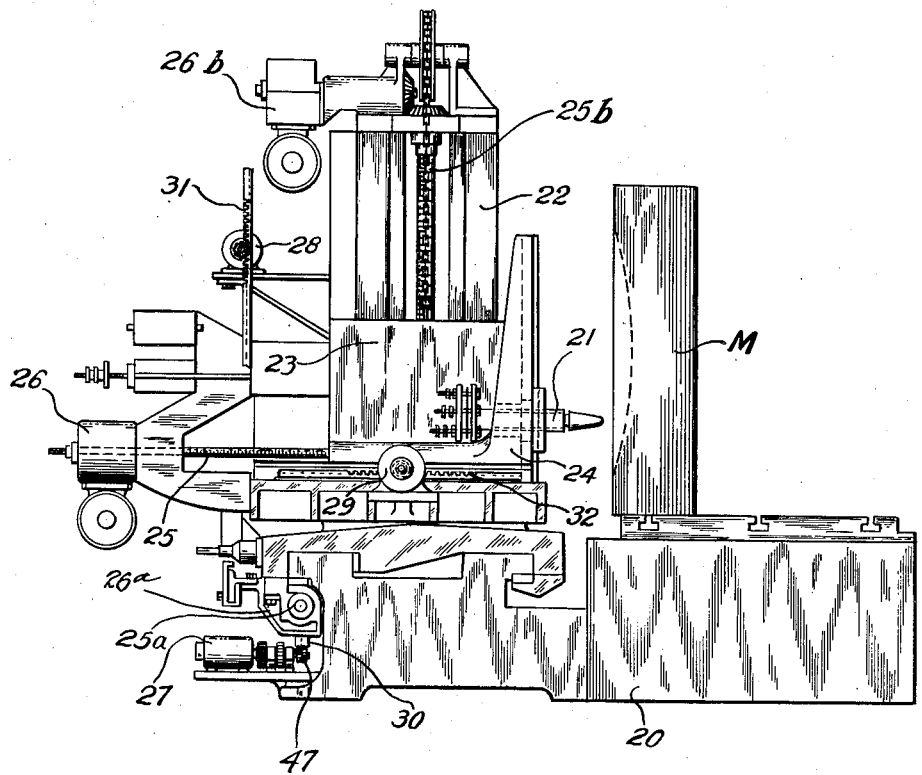
Fig. 3 is a side elevation of the model tracing machine by means of which the movements of the cutting machine shown in Figs. 1 and 2 are controlled.

Referring to Fig. 3 it will be noted that a machine generally similar in outline to that shown in Figs. 1 and 2 is illustrated, there being a model M mounted in fixed position upon a base 20 and there being a tracer 21 movable in the directions of the three co-ordinate planes. To effect these movements of the tracer slides there is provided a column 22 longitudinally movable along the base 20 on which is mounted a vertically movable head 23 having mounted thereon a tracer carrying slide 24 movable toward and from the model M. Movements of these members 22, 23 and 24 are controlled as indicated in Fig. 3 by screws 25, 25ᵃ and 25ᵇ which can be rotated in opposite directions by means of electromagnetic drives 26, 26ᵃ and 26ᵇ respectively similar to those in the cutting machine shown in Figs. 1 and 2 and to the electromagnetic drives described and claimed in the patent to Shaw referred to above. The circuits controlling the longitudinal movements of the column 22 as well as the vertical movements of the head 23 and the movements of the slide 24 toward and from the model M are generally similar to those shown in the above-mentioned patent and also generally similar to the means used in the die sinking machine illustrated in Figs. 1 and 2. The tracer 21 is in every way similar to that shown in Fig. 16 of the above-mentioned patent, which is that used in the three-dimensional work generally referred to as die sinking, but it will be understood that a tracer such as shown in Fig. 27 of the patent to Shaw may be substituted whenever the machine is to be used for profiling.

Movements of the column 22 longitudinally of the base 20, and of the head 23 vertically along the column 22, and of the slide 24 horizontally toward the model M on the head 23 in the present machine shown in Fig. 3, serve to rotate the rotors of individual generators 27, 28 and 29 of self-synchronizer sets. The rotors of these generators have pinions thereon engaging racks 30, 31 and 32 respectively movable individually with each of the movable members 22, 23 and 24. As each of the three generators is similar, but one will require description.

It will be seen that each of the casings of the generators 27, 28 and 29 of the self-synchronizer sets is fixed in position, one generator 27 being fixed upon the base 20 and having its rotor rotated by movement of the column 22 longitudinally along the base 20 by means of a rack 30 carried by and movable with the column 22. There is also a generator 28 fixed to a side of the column 22 and having a pinion on its rotor engaging a rack 31 carried by the vertically movable head 23, and on the head 23 is a third generator 29 having its rotor rotated by a pinion thereon engaging a rack 32 movable with the slide 24 toward and from the model M. Movement, therefore, of any one of these members 22, 23 or 24 will correspondingly rotate the rotor of one of the generators 27, 28 or 29 respectively. Each of these generators 27, 28 and 29 on the tracer traversing machine is electrically connected to a corresponding motor 33, 34, 35 of the self-synchronizer set on the cutting machine, that is, the generator 27 on the base 20 rotated by movements of the tracer 21 longitudinally past the model M is connected electrically to and rotates the rotor of the motor 33 mounted on the base 10 of the cutting machine. Similarly the generator 28 is connected electrically to the motor 34, and generator 29 to motor 35. Each generator 27, 28 and 29 and each motor 33, 34 and 35 may have its field excited by the same circuit as will be evident by inspection of the diagrams.

Referring now to Figs. 4, 5 and 6, it will be seen that the self-synchronous motors 33, 34 and 35, one of which is shown in Fig. 4 and partially shown in Fig. 5, carry on their rotor shafts an arm 40 movable between contact carrying levers 41 and 42 so that when the rotor is moved slightly by its generator the contact on arm 40 and one of the levers 41 or 42 will be closed. Circuits energized by the closing of these contacts and operating through suitable relays will effect movement of the cutter 11 an amount corresponding to the movement of the tracer 21 called for by the rotation of the generator connected to this follower motor. This movement of the column 12 of the cutting machine will move the rack 36 which moves with the column 12 and rotates a pinion connected through gearing to a housing 43 carrying the levers 41 and 42 and a plurality of collector rings 44 connected by conductors with the contacts closed by movement of the arm 40. Movement, therefore, of the column 12 effects rotation of the plate 43 carrying the contact levers 41 and 42 so that when movement of the column 12 has been completed the plate 43 will be rotated and the contact between arm 40 and lever 41 or 42 will be opened. Movement of column 12 will then be stopped.

Figure 9:
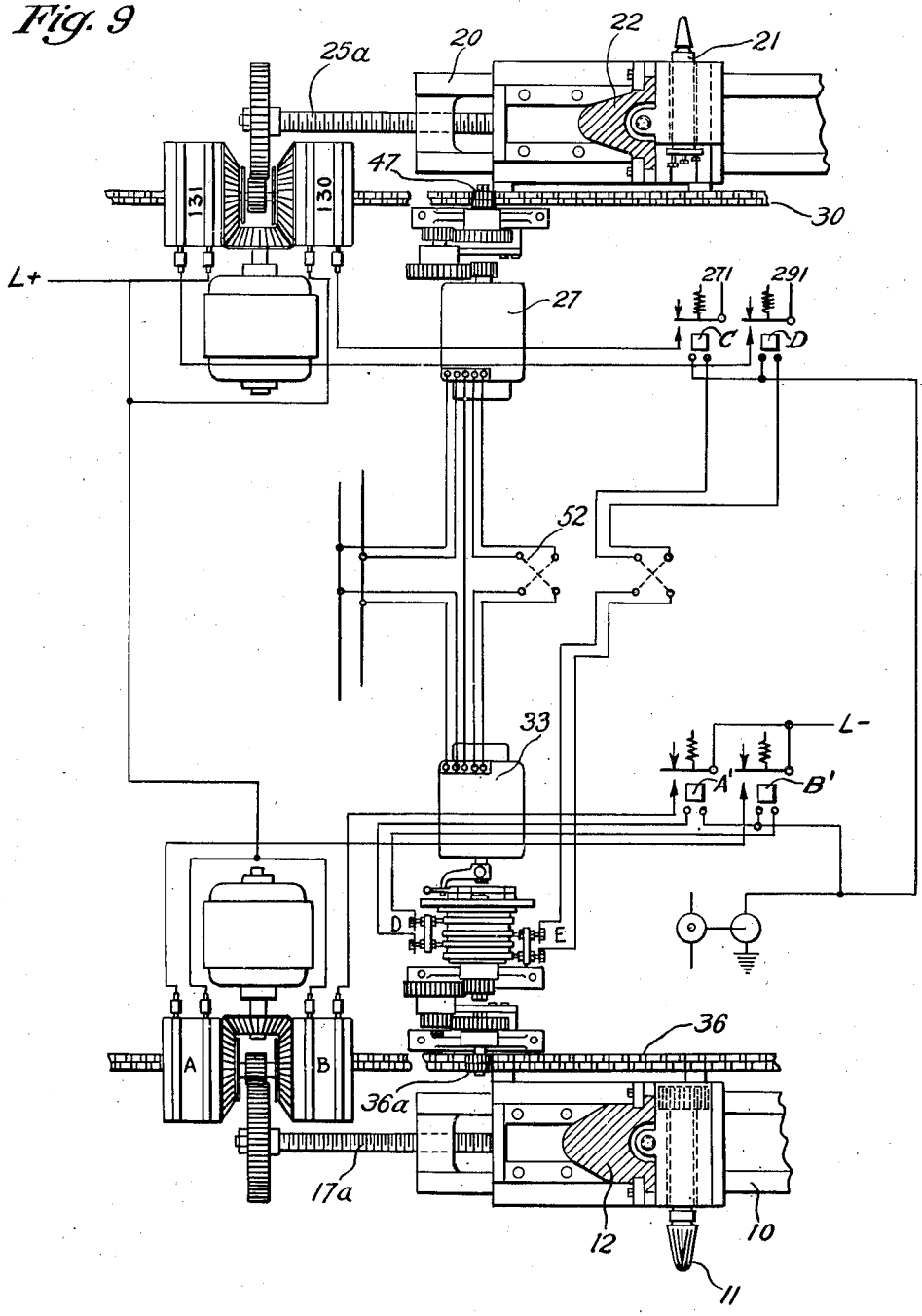
Fig. 9 is a diagrammatic view showing the circuits for effecting movements of the tracer and cutter in one direction respectively relative to the model and work blank in synchronism with each other, a reversing switch being shown in the circuits for making a left-hand copy from a right-hand model or vice versa.

By reference to the diagram shown in Fig. 9 in which a generator and motor constituting one pair of self-synchronous sets is shown, the movements effected by this set will be clear. This diagram shows the operation for one direction of movement of the tracer 21 and cutter 11, namely the movement longitudinally past the model M and work piece W respectively by movements of the columns 22 and 12. The generator 27 of the self-synchronizer set is electrically connected, as shown in the diagram, to the motor 33 of the unit controlling movements of the cutter 11 longitudinally past the work piece W. The rotors of this generator 27 and motor 33 may be supplied with current from a common source of single phase alternating current and their stator windings are directly coupled to each other as indicated. The rack 30 moves with the column 20 and rotates a pinion 47 on an intermediate shaft which through changes gears, the ratio of which may be varied, rotates the rotor of generator 27. The rotation of rotor 27 will be proportionate to the movement of the column 22 longitudinally along the base 20. The motor 33 connected to the generator 27 and which is rotated thereby and maintained in synchronism therewith serves to open or close the contacts on either side of the lever 40 on its shaft. These contacts on levers 41 and 42 respectively connect a pair of the slip rings 44 to ground controlling the operation of the relays A', B' shown in the diagram.

In addition to the contacts opened and closed by direct movement in either direction of the lever 40, supplemental contacts 48 and 49 normally closed are opened by continued movement of the lever 40 after it has closed one of the contacts. These latter contact carrying levers 48 and 49 respectively connect a pair of slip rings on housing 43 to ground controlling the operation of relays interposed for the purpose of stopping the corresponding feeding movement of the tracing machine until the movement called for by the closing of the primary contacts 41 or 42 has been completed.

Movable with the column 12 is rack 36 which is connected through change gearing to a pinion on the contact disc 43 so that movement of the column 12 will rotate the disc 43 carrying the slip rings 44 in the same direction as the direction of rotation of the rotor of motor 33. The contact between lever 41 or 42 and arm 40 will be maintained closed until rotation of generator 27 is stopped by stopping of column 22 of the tracing machine. It will be understood that in any set-up of the machine the gear ratio employed between a rack such as 36 and the contact plate 43 and the gear ratio employed between the rack 30 and the generator 27 coupled thereto will be proportioned to give the correct relative movements of the tracer 21 and cutter 11 to make a size for size or a larger or smaller work piece corresponding to the model.

Figs. 7 and 8 show an alternative form mechanism for opening and closing contacts by rotation of the rotors of follower motors 33, 34 and 35. The motor is partially shown at 33 and instead of its rotor having an arm 40 the rotor is connected directly to a shaft 58 of differential mechanism 59. The opposite shaft 60 of the differential has a pinion 61 thereon meshing with rack 36. The differential housing 59 has an arm 62 outstanding therefrom adjacent levers 63 and 64 so that rotation of the housing in either direction will close a contact between the arm 62 and one of the levers 63 or 64. Closing of one of these contacts operates in the same manner as closing contacts between the arm 40 and one of the levers 41 or 42 to move the column 12. Movement of the column 12 called for by the movement of motor rotor 33 rotates the pinion 61 and differential shaft 60 in the opposite direction to the rotation of differential shaft 58 thus causing housing 59 to remain stationary. As long, therefore, as movement of the column 12 is required the contact between arm 62 and one of the levers 63 or 64 is kept closed. When the motion called for has been completed rotation of differential shaft 58 is stopped but rotation of differential shaft 60 is continued, resulting in the housing being returned to its neutral position and the opening of the contact, thus preventing further movement. This form of contact closing mechanism may have supplemental levers 65a and 66a corresponding to and operating in the same manner as levers 65 and 66.

The following may be taken as an example. When the tracing machine column 22 moves to the right on the base 20, as seen in Fig. 9, in response to the tracer 21, the rack 30 also moves to the right, as this rack is carried by the column 22. This movement of the column and rack moves the rotor of the self-synchronous generator 27 through the intermediate gearing, as shown. The synchronous follower motor 33 in response to the movement of the rotor of the generator 27 moves the rotor of the receiver 33 in the same or the opposite direction, depending upon the position of the switch 52 in the connections between the generator and motor. This movement of the rotor of motor 33 also moves the arm 40 shown in Figs. 6 and 9 into contact with one of the contact arms 41 or 42. The closing of one of these contacts will energize, through the relay A' or B', one of the magnetic clutches A or B which in turn rotates screw 17a on the milling machine, thereby moving the column 12 to the right. As this column 12 moves to the right, the rack 36, which is fixed thereto, also moves to the right, rotating the pinion 36a and, in turn, the intermediate gearing between the rack and contact disc 43. The contact disc 43 is then moved by this column 12 in the same angular direction that the arm 40 is moved to establish the contact and at the same speed as arm 40 thereby maintaining contact. The clutch A or B and its accompanying relay A' or B' will remain energized while the contacts between arm 40 and arms 41 and 42 remain closed. When the movement of column 21 stops, rotation of motor 33 will stop and the continued movement of rack 36 will continue the rotation of disc 43 sufficiently to open the contact at arm 40, whereupon movement of the column 12 will stop.

It is evident that as soon as this opening of the contacts occurs the motion of the column 12 will be stopped. The mechanism, as shown in Fig. 6, therefore will be again centered, as shown, ready for the next impulse from the tracing machine. In the event that the speed of travel of the column 22 of the tracing machine is in excess of the speed of the travel of the column 12 when the impulse from the tracing machine is transmitted to the synchronous receiver 33, the arm 40 will close its contact to the contact on arm 41 or 42 and initiate motion of the column 12. The speed of the tracing machine column 22 is in excess of that of the milling machine column 12, so that the receiver 33 keeps moving the arm 40 beyond its normal contact position. As this takes place, the arm 42 comes in contact with the screw 65 or 66 and exerts sufficient pressure to move the contact levers 48 or 49 in Fig. 6 away from their closed position. These levers 48 and 49 are connected through conductors to slip rings on housing 43 which are connected by means of brushes to runaway relays C and D. When either lever 48 or 49 is moved by the arm 40 on the receiver 33 to open its contact, one of the relays C or D is permitted to open the circuit to the corresponding magnet on the tracing machine, thereby stopping that individual motion on the tracing machine, which will remain inoperative until such time as the column 12 has had time to move the contact disc 43 an angular distance sufficient to permit the contacts on levers 48 or 49 to again assume their normally closed position.

Upon this happening the relay C or D is again energized and the circuit to the particular magnet is again established and the tracing machine takes up its motions as directed by the tracer 21. The relays C and D are inserted in the operating circuit for the magnets of the tracing machine controlling longitudinal movements of the column 22. A control for preventing the tracer slide moving quicker than the work slide is disclosed in patent to Shaw 1,683,581, Fig. 24, the contacts being in series in the wires 271 and 291 with magnets 130 and 131. For all of the motions, vertical and transverse, as well as longitudinal, a pair of run-away relays is supplied. The points of these relays are in all cases inserted in the operating circuit for the respective magnets as close as possible to the magnet itself.

What I claim is:

1. A tracer controlled milling machine comprising in combination, a tracing machine unit having a model mounted thereon and a tracer movable relatively thereto, a milling machine unit having a work blank mounted thereon and a milling cutter movable relatively thereto, said tracing and milling machine units having separate bases, and electric circuit means to maintain movements of said cutter in synchronism with said tracer.

2. A tracer controlled milling machine comprising in combination, a tracing machine unit having a model mounted thereon and a tracer movable relatively thereto, a milling machine unit having a work blank mounted thereon and a milling cutter movable relatively thereto, said tracing and milling machine units having separate bases, and electric circuit means controlled by said tracer flexibly connected to said milling machine unit to maintain movements of said cutter in synchronism with said tracer.

3. A tracer controlled milling machine comprising in combination, a tracing machine unit having a model mounted thereon, tracer supporting slides on said tracing machine unit movable respectively at right angles to each other whereby said tracer may move in any direction relative to said model, a milling machine unit having a work blank mounted thereon, cutter supporting slides on said milling machine unit movable respectively at right angles to each other, said tracing and milling machine units having separate bases, and electric circuit means controlled by said tracer to maintain movements of said cutter supporting slides in synchronism respectively with said tracer supporting slides.

4. A tracer controlled milling machine comprising in combination, a tracing machine unit having a model mounted thereon, tracer supporting slides on said tracing machine unit movable respectively at right angles to each other whereby said tracer may move in any direction relative to said model, means to traverse said tracer over said model, a milling machine unit having a work blank mounted thereon, cutter supporting slides on said milling machine unit movable respectively at right angles to each other, said tracing and milling machine units having separate bases, means to traverse said tracer over said model, mechanism for moving said cutter supporting slides, and means controlled by contact of said tracer with said model during said traversing movements and flexibly connected to the cutter slide moving mechanism to maintain movements of said cutter in synchronism with said tracer.

5. A tracer controlled milling machine comprising in combination, a tracing machine unit having a model mounted thereon and a tracer movable relatively thereto, a generator of a self-synchronizer set rotated by said movements, a milling machine unit having a work blank mounted thereon and a milling cutter movable relatively thereto, a follower motor of said self-synchronizer set on said milling machine unit rotated by said generator, circuits connecting said generator and motor, and circuits closed by rotation of said motor to effect movements of said cutter corresponding to movements of said tracer.

6. A tracer controlled milling machine comprising in combination, a tracing machine unit having a model mounted thereon and a tracer movable relatively thereto, means to traverse said tracer over said model, generators of self-synchronizer sets rotated by said movements, a milling machine unit having a work blank mounted thereon and a milling cutter movable relatively thereto, follower motors of said self-synchronizer sets on said milling machine unit respectively rotated by said generators, and circuits closed by rotation of said motors to effect movements of said cutter corresponding to movements of said tracer.

7. A tracer controlled milling machine comprising in combination, a tracing machine unit having a model mounted thereon and a tracer movable relatively thereto, generators of self-synchronizer sets rotated by said movements, means to traverse said tracer over said model, a milling machine unit having a work blank mounted thereon and a milling cutter movable relatively thereto, follower motors of said self-synchronizer sets on said milling machine unit rotated respectively by said generators, circuits closed by rotation of said motors to effect movements of said cutter corresponding to movements of said tracer, and means to discontinue said cutter movements when movements thereof conforming to movements of said tracer have been completed.

8. A tracer controlled milling machine comprising in combination, a tracing machine unit having a model mounted thereon and a tracer movable relatively thereto, generators of self-synchronizer sets rotated by said movements, means to traverse said tracer over said model, a milling machine unit having a work blank mounted thereon and a milling cutter movable relatively thereto, follower motors of said self-synchronizer sets on said milling machine unit rotated by said generators, and circuits closed by rotation of said motors, said circuits being opened when movements of said cutter corresponding to movements of said tracer have been completed.

9. A tracer controlled milling machine comprising in combination, a tracing machine unit having a model mounted thereon and a tracer movable relatively thereto, generators of self-synchronizer sets rotated by said movements, means to traverse said tracer over said model, a milling machine unit having a work blank mounted thereon and a milling cutter movable relatively thereto, follower motors of said self-synchronizer sets on said milling machine unit rotated respectively by said generators, and circuits closed by rotation of said motors to effect movements of said cutter in accordance with said tracer, said circuits being opened when movements of said cutter corresponding to movements of said tracer have been completed.

10. A tracer controlled milling machine comprising in combination, a tracing machine unit having a model mounted thereon and a tracer movable relatively thereto, generators of self-synchronizer sets rotated by said movements, means to traverse said tracer over said model, a milling machine unit having a work blank mounted thereon and a milling cutter movable relatively thereto, follower motors of said self-synchronizer sets on said milling machine unit rotated respectively by said generators, circuits closed by rotation of said motors and cutter moving means rendered operative by closing of said circuits, said circuits being opened when movement of said cutter corresponding to movement of said tracer has been completed.

11. A tracer controlled milling machine comprising in combination, a tracing machine unit having a model mounted thereon and a tracer movable relatively thereto, a generator of a self-synchronizer set rotated by said movements, means to traverse said tracer over said model, a milling machine unit having a work blank mounted thereon and a milling cutter movable relatively thereto, a follower motor of said self-synchronizer set on said milling machine unit rotated by said generator, and a circuit closed by rotation of said motor in either direction to effect movements of said cutter in opposite directions, and means operated by movements of said cutter to open said circuit when movement of the cutter corresponding to that of the tracer has been completed.

12. A tracer controlled milling machine comprising in combination, a tracing machine unit having a model mounted thereon and a tracer movable relatively thereto, generators of self-synchronizer sets rotated by said movements, means to traverse said tracer over said model, a milling machine unit having a work blank mounted thereon and a milling cutter movable relatively thereto, follower motors of said self-synchronizer sets on said milling machine unit rotated by said generators, and circuits closed by rotation of said motors to effect movements of said cutter in any direction, and means operated by movements of said cutter to open said circuits when movement of the cutter corresponding to that of the tracer has been completed.

13. A tracer controlled milling machine comprising in combination, a tracing machine unit having a model mounted thereon and a tracer movable relatively thereto, generators of self-synchronizer sets rotated by said movements, means to traverse said tracer over said model, a milling machine unit having a work blank mounted thereon and a milling cutter movable relatively thereto, follower motors of said self-synchronizer sets on said milling machine unit rotated by said generators, and circuits closed by rotation of said motors in synchronism with their generators to effect movements of said cutter in accordance with movements of said tracer, and means operated by movements of said cutter to open said circuits when movements of the cutter effected by said circuits corresponding to that of the tracer have been completed.

14. A tracer controlled milling machine comprising in combination, a tracing machine unit having a model mounted thereon and a tracer movable relatively thereto, generators of self-synchronizer sets rotated by movements of said tracer, means to traverse said tracer over said model, a milling machine unit having a work blank mounted thereon and a milling cutter movable relatively thereto, follower motors of said self-synchronizer sets on said milling machine unit rotated by movements of said generators, and circuits controlled by rotation of said follower motors, whereby movements of said cutter relative to said work blank corresponding in direction and amount to movements of said tracer may be effected.

15. A tracer controlled milling machine comprising in combination, a tracing machine unit having a model mounted thereon and a tracer movable relatively thereto in the directions of the three co-ordinate planes, a generator of a self-synchronizer set rotated by movements of said tracer in each of the three co-ordinate planes, means to traverse said tracer over said model, a milling machine unit having a work blank mounted thereon and a milling cutter movable relatively thereto, follower motors of said self-synchronizer sets on said milling machine unit rotated respectively by movements of said generators, and circuits controlled by rotation of said follower motors, whereby movements of said cutter relative to said work blank and corresponding to movements of said tracer in any of said three planes may be effected.

ROBERT D. SHAW.